H. H. HALLETT.
Work-Trimmer for Sewing-Machines.
No. 202,721. Patented April 23, 1878.
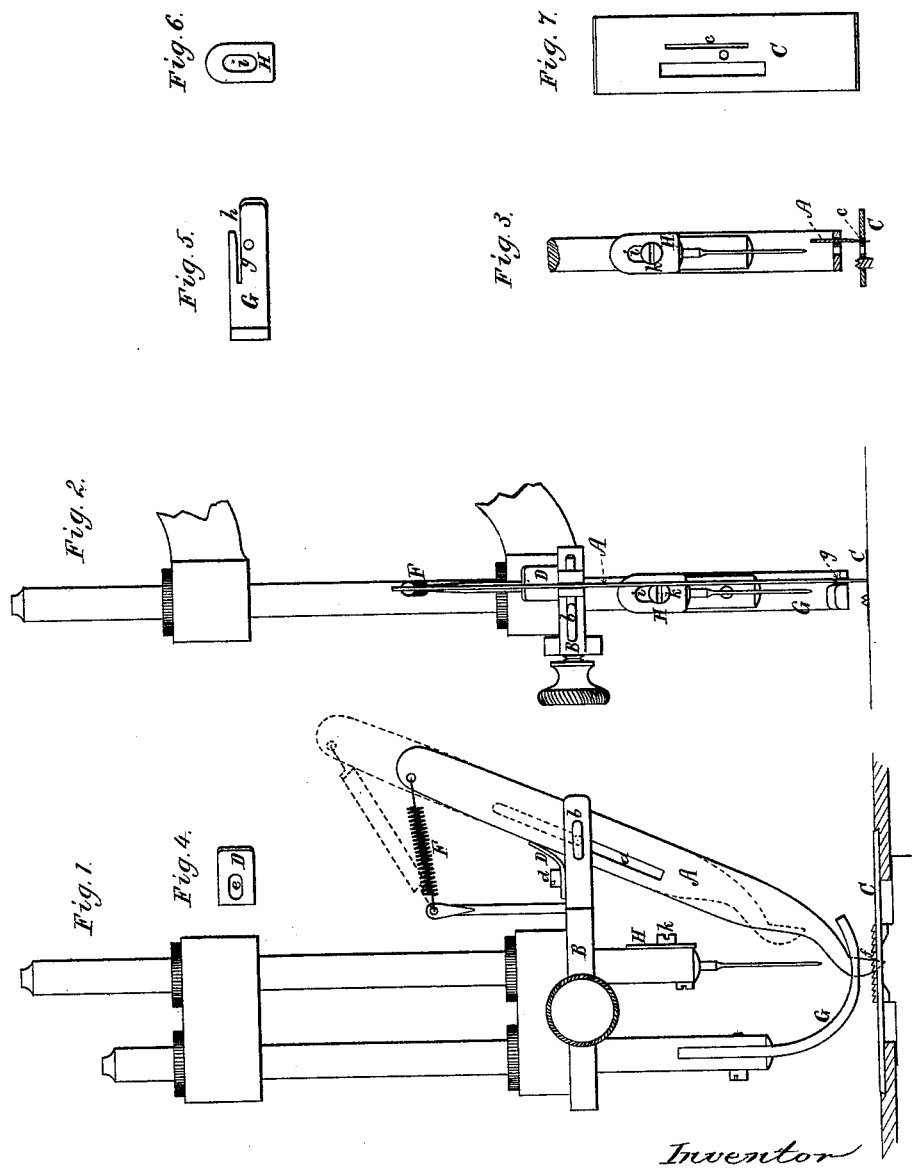
Inventor
Hervey H. Hallett.
by his attorney
Witnesses

UNITED STATES PATENT OFFICE.

HERVEY H. HALLETT, OF ROCKLAND, MASSACHUSETTS.

IMPROVEMENT IN WORK-TRIMMERS FOR SEWING-MACHINES.

Specification forming part of Letters Patent No. 202,721, dated April 23, 1878; application filed August 2, 1877.

*To all whom it may concern:*

Be it known that I, HERVEY H. HALLETT, of Rockland, of the county of Plymouth, of the State of Massachusetts, have invented certain new and useful Improvements in Work-Trimmers for Sewing-Machines; and do hereby declare the same to be described in the following specification and represented in the accompanying drawings, of which—

Figure 1 is a front elevation, Fig. 2 a side view, and Fig. 3 a transverse section, of a sewing-machine work-support plate, needle-bar, presser-foot, and work-trimmer furnished with my invention.

The invention consists in the combination of the needle-carrier, the work-support plate, an arm, and a work-trimmer pivoted to such arm, and provided with a slot to receive the pivot, and enable the said trimmer to vibrate within and to be raised out of the slot of the work-support plate, all being substantially as set forth.

It also consists in the combination, with the work-trimmer and its carrier, of mechanism for elevating the trimmer out of the path of the shuttle after each descent of the said trimmer in the work.

The object of supporting the work-trimmer so as to render it capable of being readily withdrawn from the work, and as readily replaced thereon without disturbing the connection of the trimmer with the supporter thereof, is to prevent the trimmer from cutting through any accessory or accessories of the work which it may be desired to screw through and not trim—as, for instance, a strap projecting from the work.

To this end I construct the work-trimmer A with a long pivotal slot, *a*, arranged in it, as shown. The pivot *b*, on which the trimmer vibrates, extends through the trimmer-carrier B and the said slot. The upper end of the slot rests on the pivot when the trimmer is in place within its slot *c* on the work-support plate C. By taking hold of the trimmer and pulling it upward, it may be readily raised out of the work, and be as readily restored to place, as occasion may require. Fig. 7 is a top view of the work-support plate C.

There is fixed to the carrier B, by means of a clamp-screw, *d*, a short adjustable spring or elastic stop, D, a top view of which is shown in Fig. 4, it being provided with a short slot, *e*, to receive the said screw, which is screwed into the carrier. This spring, as represented, answers two purposes—that is to say, it not only serves as an adjustable stop to prevent the cutting-edge of the work-trimmer from being dulled by being drawn by the spring F against the end of the slot in the support-plate after the removal of a piece of work therefrom, but, being a spring, it serves, after each descent of the work-trimmer in the work, to so move the trimmer as to raise its point or lower end entirely out of the path of the shuttle, when used in a race disposed directly under the work-support plate. As the trimmer is depressed by the needle-bar or the adjustable striker H thereof, it usually has to be forced down more or less into the shuttle-race. Immediately on the needle-bar rising upward, the spring-stop D, which previously has had the upper arm of the trimmer forced against it, will be free to act, and by its elastic power will so move the trimmer as to cause its lower end to rise out of the race or path of the shuttle thereon, in order that, during the throw of the shuttle, the said shuttle may not be impeded in its motion by the trimmer or the latter be injured by the shuttle. Heretofore, or before adopting the elastic or spring stop, I have used a rigid stop, as will be seen by reference to the Patent No. 191,581, granted to me June 5, 1877. This rigid stop simply performed one of the functions of the elastic or spring stop hereinafter explained.

The work-trimmer A has an inclined cutting-edge, *f*, and is disconnected from, or in no respect pivoted to, the work-support plates, but is supported so as to vibrate or move up and down or laterally therein. It is also supported and constructed so as to be capable, as described, of being readily raised out of the plate and the work and returned to place, under circumstances and in manner, or for the purpose, as hereinbefore explained.

The presser-foot G (shown in top view in Fig. 5) has a guide-slit, *g*, made in and opening out of it, or into a notch, *h*, formed in it, as represented. This guide-slit is to be directly over the work-support-plate slot *c* for reception of the trimmer, and when such slot is covered by the work the guide-slit serves to guide the trimmer into the proper position over the work for such trimmer to be forced therein and into the slot of the support-plate.

Instead of having fastened to the lower end of the needle-bar an unadjustable striker to act against the work-trimmer, I apply to such an adjustable striker, H, a side view of which is shown in Fig. 6. It has a slot, $i$, in it to receive the screw $k$, by which it is clamped to the needle-bar. The object of having the striker adjustable vertically in the needle-bar is to enable it to be properly arranged as it, or the trimmer-edge against which it may work, may become worn.

I do not claim a work-trimmer pivoted at the lower end of its cutting-edge to the work-supporting part of a sewing-machine, and to extend through and to be operated by a slotted arm projecting from the needle-bar, all being as represented in the United States Patent No. 145,937; nor do I herein claim, as shown in my Patent No. 191,584, a rigid adjustable stop applied to the carrier of the work-trimmer; nor do I claim an unadjustable striker applied to the foot of the needle-bar, as shown in the patent last mentioned.

What I claim as of my invention may be stated as follows:

1. In combination with the needle-carrier, the work-support plate, and the carrier B, the pivoted work-trimmer A, having a slot, $a$, arranged in it, and with its supporting-pivot $b$, in manner essentially as specified, to enable the said trimmer to vibrate within and to be raised out of the slot of the said work-support plate, all being substantially as set forth.

2. In combination with the work-trimmer, mechanism for elevating it out of the track of the shuttle after each descent of the said trimmer in the work, such mechanism, as shown, being the spring D, affixed to the carrier B.

HERVEY H. HALLETT.

Witnesses:
R. H. EDDY,
JOHN R. SNOW.